United States Patent [19]

Nakauchi

[11] 4,160,163

[45] Jul. 3, 1979

[54] FLAME SENSING SYSTEM

[75] Inventor: Shunsaku Nakauchi, Mitaka, Japan

[73] Assignee: Security Patrols Co., Ltd., Tokyo, Japan

[21] Appl. No.: 825,386

[22] Filed: Aug. 17, 1977

[30] Foreign Application Priority Data

Feb. 15, 1977 [JP] Japan ................................ 52-14640

[51] Int. Cl.$^{2}$ ................................................ G01J 1/00

[52] U.S. Cl. .................................... 250/339; 250/340

[58] Field of Search ............... 250/338, 339, 340, 351, 250/503, 554

[56] References Cited

U.S. PATENT DOCUMENTS

| | | | |
|---|---|---|---|
| 3,026,413 | 3/1962 | Taylor | 250/339 |
| 3,539,807 | 11/1970 | Bickel | 250/338 |
| 3,903,418 | 9/1975 | Horn | 250/338 |

*Primary Examiner*—Alfred E. Smith
*Assistant Examiner*—Janice A. Howell
*Attorney, Agent, or Firm*—Cameron, Kerkam, Sutton, Stowell & Stowell

[57] ABSTRACT

A flame sensing system according to the invention makes use of infra-red rays produced by resonant radiation of carbon dioxide in a flame and gives no wrong information due to discharge of thunder or sunlight and has high sensitivity with good S/N ratio. The flame sensing system is characterized in that when a ratio of an output of intensity of a first radiation produced by resonant radiation of carbon dioxide to an output of intensity of a second radiation having a wavelength located in the vicinity of the wavelength of said first radiation in the region of wavelength in which there is little absorption by the carbon dioxide in the air exceeds a predetermined value, difference in intensity between said first radiation and said second radiation is detected either by increasing the output of said first radiation or by decreasing the output of said second radiation thereby to give a warning.

2 Claims, 7 Drawing Figures

FLAME SENSING SYSTEM

This invention relates to a flame sensing system utilizing infra-red rays emitted by resonant radiation of carbon dioxide (hereinafter referred to as $CO_2$) irradiated from $CO_2$ in a flame.

It has been known that resonant radiation of a particular wavelength is taking place from $CO_2$ in the flame being in a high temperature condition. Radiant rays generated by such resonant radiation can exist from the area of ultraviolet to infra-red, and the present invention is concerned with a flame sensing system utilizing resonant radiation of infra-red rays present in the vicinity of 2μ or 4.4μ.

Heretofore there have been proposed a number of flame sensors utilizing radiant rays. One of them makes use of ultraviolet rays, another makes use of flicker of visible rays, still another makes use of near infra-red rays and still another makes use of flicker of infra-red of wavelength in the vicinity of 4.4μ.

These sensors have the drawbacks that they tend to provide wrong information and increase in sensitivity is low. Taking a flame sensor utilizing ultra-violet rays as an example, a thunder or an electric spark caused wrong operation. As for the flame sensor utilizing flicker of visible rays or infra-red rays, wrong operation took place with the sunlight or artificial light. The flame sensor utilizing ultra-violet rays, has drawbacks in that ultra-violet rays of shorter wavelength contained in the smoke coming out of the flame are apt to be absorbed and range of sensitivity is therefore restrained.

The present invention precludes these drawbacks and intends to provide a flame sensing system which enables avoidance of wrong information caused by discharge of thunder or sunlight and sensing of a flame with high sensitivity and a good S/N ratio.

The flame sensing system according to the invention detects difference in intensity between a first radiation produced by resonant radiation of carbon dioxide and a second radiation having a wavelength located in the vicinity of the wavelength of said first radiation in the region of wavelength in which there is little absorption by the carbon dioxide in the air thereby to actuate a warning device and is characterized in that when a ratio of an output of intensity of said first radiation to an output of intensity of said second radiation exceeds a predetermined value, difference in intensity between said first radiation is defective and said second radiation either by increasing the output of said first radiation or by decreasing the output of said second radiation thereby to give a warning.

The invention will now be described in detail by reference to the drawings. First of all explanation will be given to a flame sensor of basic type of the present invention.

Figure 1:
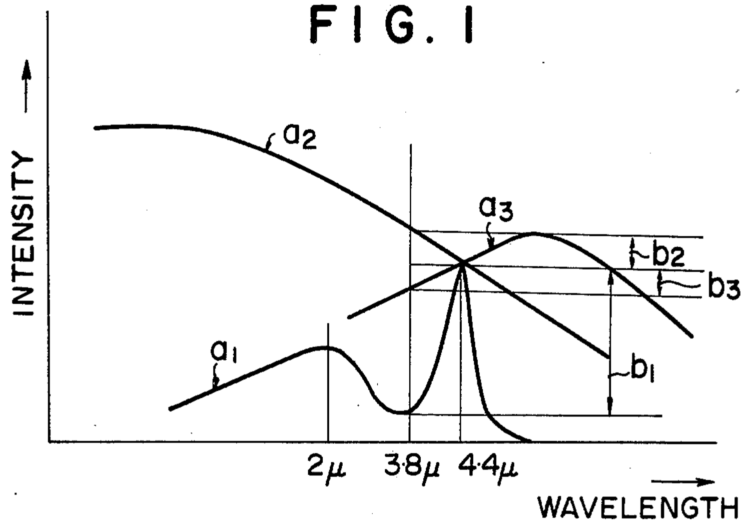
FIG. 1 shows radiation spectra of various radiant bodies.

FIG. 1 shows radiation spectra of various typical irradiant bodies.

$a_1$ represents a spectrum of a flame burning accompanied with oxidation which contains intensive resonant radiation of $CO_2$ at the wavelength of 4.4μ and in the vicinity of 2μ. $a_2$ represents a spectrum of the sunlight or an irradiant bodies such as for example an electric stove having a temperature higher than 1000° C. The spectrum at the wavelength near 4.4μ has intensity considerably smaller than that of visible rays but exists in the form of continuous spectrum.

$a_3$ represents radiation of a black body having a temperature for example about 300° C. considerably lower than an electric stove which radiation has a continuous spectrum having a peak at the longer wavelength than 4.4μ.

In FIG. 1 three spectra having the same intensity at the wavelength of 4.4μ are illustrated by way of example. With the radiation incoming as illustrated, if a flame is detected with the radiation having passed the band-pass filter of 4.4μ, it follows that every irradiant body having the spectrum $a_1$, $a_2$ and $a_3$ is sensed as a flame.

For this reason, according to the invention, there is provided a band-pass filter having a pass band at an appropriate wavelength near 4.4μ, for example about 3.8μ or 4.1μ and difference in intensity is made between the radiation having passed the band-pass filter and the radiation having passed a filter of 4.4μ. In this way distinction of three radiations having spectra $a_1$, $a_2$ and $a_3$ shown in FIG. 1 is made.

By the provision of the above-mentioned means, difference between the amount of passage of 4.4μ as shown by $b_1$ of FIG. 1 and that of 3.8μ is detected in case of for example a flame. In case of the spectrum $a_2$, the spectrum in the vicinity of 4.4μ is a continuous spectrum and the above-mentioned difference is considerably smaller than the difference $b_1$ as shown by $b_2$. Generally the amount having a sign opposite to that of the difference $b_1$ is detected and, as far as the spectrum $a_3$ is concerned, the difference $b_3$ has the same sign as the difference $b_1$ but is considerably small as compared with the difference $b_1$. In this manner, the spectrum $a_1$ can be distinguished from the spectra $a_2$ and $a_3$.

Figure 2:
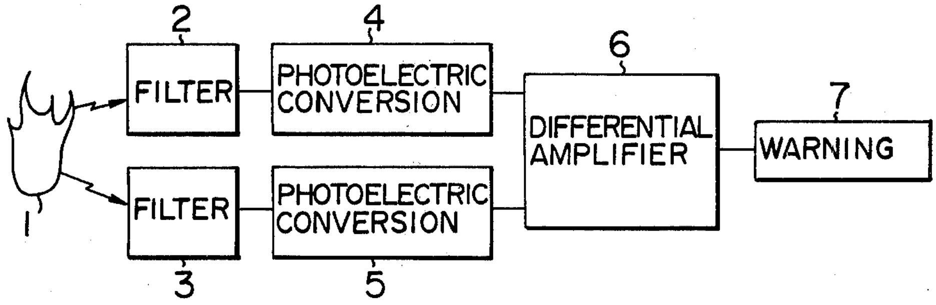
FIG. 2 is a block diagram used for explanation of the principle of a flame sensor.

FIG. 2 is a block diagram showing a device constituted based on the above-mentioned principle. In FIG. 2, reference numeral 1 designates an irradiant body, reference numeral 2 designates a band-pass filter of 4.4μ, 3 is a band-pass filter of a wavelength different from 4.4μ, 4, 5 indicate photoelectric conversion device for rays having passed the band-pass filters 2, 3, 6 is a differential amplifier adapted to take and amplify the difference between the outputs of the photoelectric conversion devices 4, 5 and 7 is a warning device adapted to work when the differential amplifier has an output being over a predetermined level.

Referring to FIG. 2, when the irradiant body is a flame, there is a great difference in intensity of the radiations having passed the band-pass filters 2, 3 and thus a large output will appear at the output of the differential amplifier 6 and actuate the warning device 7.

In brief, intensity of radiations at a plurality of points of wavelength of the spectrum emitted by a certain irradiant body is measured by use of a plurality of band-pass filters and it is detected by taking difference therebetween whether the spectrum of the irradiant body is a line spectrum of the wavelength peculiar to the flame or a continuous spectrum. If the line spectrum is detected, a flame can be sensed.

In the block diagram shown in FIG. 2, the number of the photoelectric conversion devices 4, 5 is the same as that of the band-pass filters 2, 3; however, a single photoelectric conversion device may be used to treat the amount of rays having passed a plurality of band-pass filters.

Figure 3:
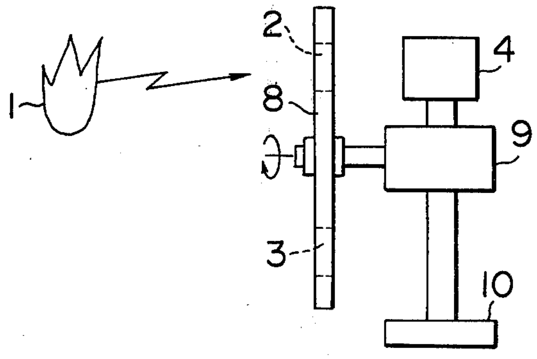
FIG. 3 is a schematic illustration of the structure of an embodiment of a flame sensor to which the present invention is applicable.

FIG. 3 is a schematic illustration of the structure of a flame sensor to which the present invention is applicable and particularly intended for explanation of the relationship between the band-pass filters 2, 3 and the photoelectric conversion device 4.

In FIG. 3, reference numeral 8 designates a rotatable board on which band-pass filters 2, 3 are mounted, 9 is an electric motor for rotating the rotatable board 8 and 10 is a base mount. A single photoelectric conversion 4 is provided for a plurality of band-pass filters. The photoelectric conversion device 4 is so positioned that the band-pass filters 2, 3 take alternate positions in front of the device 4 when the rotatable board 8 is rotated.

In other words, the photoelectric conversion device 4 sees the irradiant body through the band-pass filters 2 and 3 alternately. If it is assumed that outputs of the photoelectric conversion device 4 derived by use of the band-pass filters 2, 3 are $e_2$ and $e_3$, they will appear as shown in FIG. 4.

Figure 4:
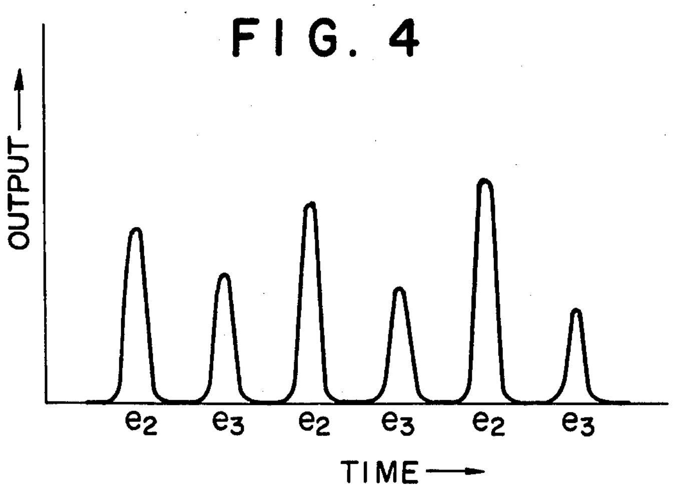
FIG. 4 is an illustration of the outputs of a photoelectric conversion device.

In FIG. 4, an abscissa represents time and an ordinate represents an output of the photoelectric conversion device 4.

Figure 5:
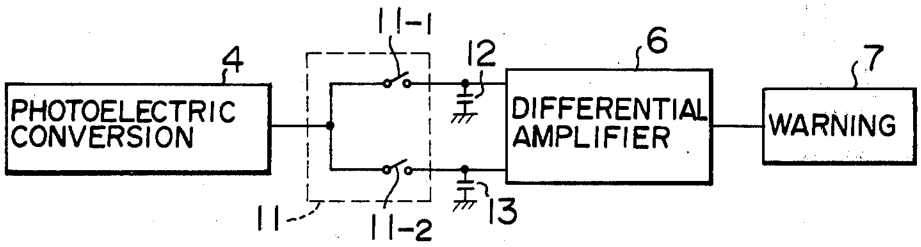
FIG. 5 shows an example of a circuit for treating the output of the photoelectric conversion device.

The output of the photoelectric conversion device 4 as shown in FIG. 4 is treated by the circuit as shown in FIG. 5.

In FIG. 5, reference numeral 11 is a switch synchronized with the rotating board 8. Arrangement is made so that when the band-pass filter 2 has reached just in front of the photoelectric conversion device 4, a switch 11-1 closes temporarily and then opens and on the other hand, when the band-pass filter 3 has reached just in front of the photoelectric conversion device 4, another switch 11-2 closes temporarily and then opens.

The output of the photoelectric conversion device 4 obtained at the time of closure of the switch 11-1 or 11-2 is stored in a capacitor 12 or 13. Namely, the capacitors 12, 13 and the switch 11 forms a sort of a sample holding circuit. The outputs of the capacitors 12 and 13 are led to two input terminals of the differential amplifier 6, respectively, and difference therebetween is amplified and the output is effective to operate the warning device 7. The system shown in FIG. 3 is effective not only to reduce the number of the photoelectric conversion devices but also to remove the influence due to unevenness of performance of the photoelectric conversion devices.

In the embodiments as above described, two band-pass filters have been used. However, a single photoelectric conversion device will be sufficient for more than three band-pass filters if a rotating board having them mounted thereon is used.

Next explanation will be given to a method of precluding influence of $CO_2$ in the air and solar light according to the sensing system of the present invention.

As mentioned above, direct rays of the solar light has a high intensity at the wavelength of 4.4μ. This intensity is different at different latitudes, in different seasons or at different times, and the intensity is of almost the same level as that received from the radiation emitted by combustion of alcohol on a dish with a diameter of 70 cm at noon on fine day in January in Tokyo at the place 50 m apart therefrom. The intensity of the radiation at the wavelength of 3.8μ is about ten times that at the wavelength of 4.4μ. Therefore the solar radiation of the wavelength of 4.4μ cannot be a cause of erroneous information as difference of that radiation from the intensity of radiation at the wavelength of 3.8μ is made according to the flame detection system of the present invention, but the solar radiation can be a cause to lower sensitivity of the flame sensing in association with $CO_2$ in the air as described hereinafter.

Accordingly, the system according to the present invention is intended to prevent sensitivity from lowering due to solar light by means of the following approach.

The solar light is irradiating a spectrum of black body radiation of about 6000° C. which is absorbed at a particular wavelength when the radiation passes through the gas present near the sun and the atmosphere of the earth. A problem involved in the absorption is absorption of the wavelength of 4.4μ by $CO_2$ in the air. When comparison of intensity is made among wavelengths of 4.4μ, 4.1μ and 3.8μ of direct rays of the solar light reaching the ground, if it is assumed that the intensity of the wavelength of 4.4μ at noon in January in Tokyo is 1, the intensity of the wavelength of 4.1μ is about two times and the intensity of the wavelength of 3.8μ is about ten times. When the place (latitude), season and time are set, the values of these intensities become constant since the length of path along which the solar light passes in the atmospheric layer is determined and the content of $CO_2$ in the air is substantially constant and about 0.03%. This direct solar light passes the band-pass filters 2 and 3 and into the photoelectric conversion device 4, and, with the intensity at the wavelength of 4.4μ being smaller than that at the wavelength of 3.8μ, a noise having an opposite polarity to a signal of a flame will appear at an output of the differential amplifier 6 and then sensitivity to the flame is lowered by the amount corresponding to the output. In order to remove these drawbacks, the flame sensing system according to the invention employs the system of FIG. 6 added to the system of FIG. 2.

Figure 6:
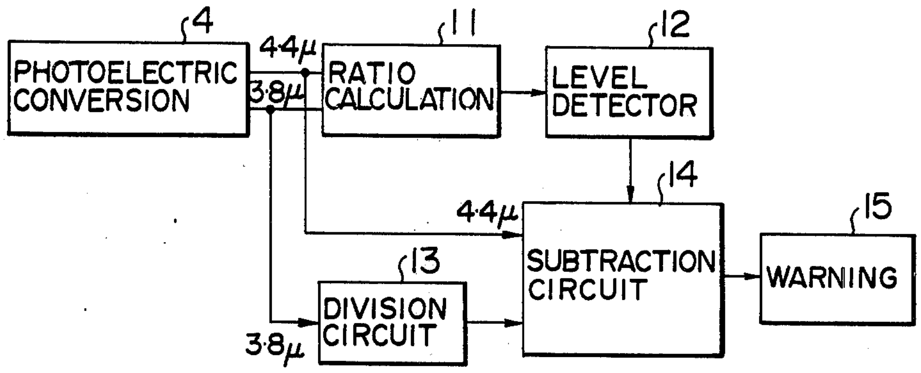
FIG. 6 is a block diagram of an embodiment of the invention.

Referring now to FIG. 6, reference numeral 11 designates a circuit for calculating a ratio of two outputs at wavelengths of 3.8μ and 4.4μ from the photoelectric conversion device 4, reference numeral 12 designates a level detector adapted to deliver an output when the output of the calculation circuit 11 exceeded a predetermined value thereby indicating that the incidence of direct sunlight might be caused, reference numeral 13 designates a circuit for delivering an output by division and multiplication of the output of 3.8μ from the photoelectric conversion device 4, 14 is a subtraction circuit for subtracting the output of the division circuit 13 from the output of 4.4μ which circuit is operated only when the output from the level detector is present and 15 is a warning circuit for giving a warning when the output of the subtraction circuit 14 exceeds a certain predetermined level.

It is preferable that the reference level of the level detector 12 is caused to change with times of a day with the aid of a clock associated with detector. In the area like Japan which belongs to the latitude of approximately 35° to 40°, it is practically no problem that the reference level is set to about 1/10 (ten times). In any area on the earth, it has practically no problem to select a ratio or a half of a ratio of 4.4μ to 3.8μ of the direct solar rays of the summer solstice on that particular area (1/10 to 1/20 for the case of Japan). It is proper to select a fraction (usually about a half) of a flame sensing level under the normal condition where direct solar rays do not directly come in as an operation level of the warning circuit 15 in order to avoid an erroneous operation and to sense only the flame. As mentioned above, it is judged from the ratio of radiations of 4.4μ and 3.8μ whether the direct sun light impinges on the flame sensor or not. It is possible to compensate for the degradation of sensitivity due to impingement of the direct sun light by reducing of the output of 3.8μ to some extent or increasing the output of 4.4μ to some extent in response to the detection of the impinging of the direct sunlight by taking the difference between the reduced output of 3.8μ and the output of 4.4μ or between the output of 3.8μ and the increased output of 4.4μ.

Figure 7:
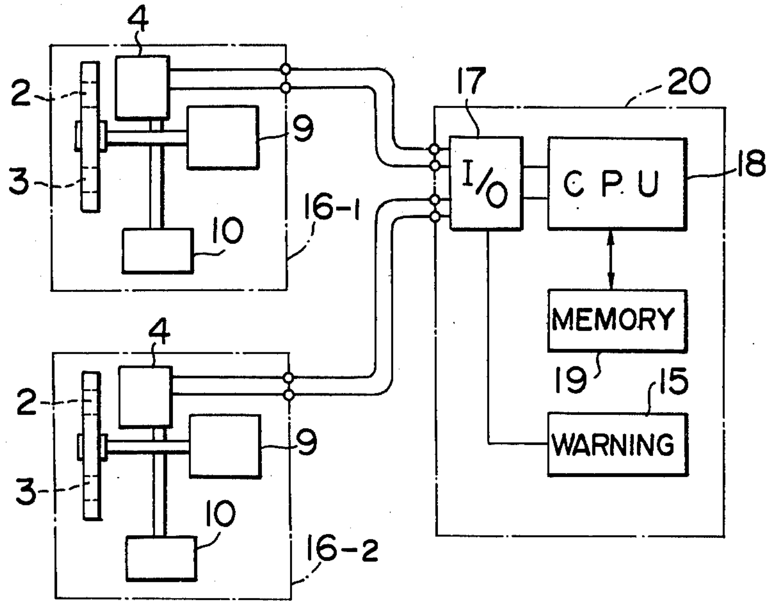
FIG. 7 is a view intended to give explanation to a central treatment system of flame sensing.

FIG. 7 is a schematic diagram of another arrangement. In FIG. 7, reference numeral 16 designates a sensing head constituted by band-pass filters 2, 3, a rotary disc 8, a motor 9 and a base mount 10. Reference numeral 17 designates an input device 17 which will be called I/O hereinafter, reference numeral 18 designates a central processing unit which will be called CPU hereinafter, reference numeral 19 designates a memory device and reference numeral 20 designates a receiving device. Signals of 4.4μ and 3.8μ are transmitted from the sensing head 16 to the receiving device 20 via lines. In the receiving device 20, the signals from the sensing head 16 are passed into CPU 18 through I/O 17 and CPU 18 calculates a ratio of signals of 4.4μ and 3.8μ by way of operation with the memory device 19 and calculates whether the direct solar light is impinging or not. If the light is impinging, the output of 4.4μ is modified as mentioned above. More particularly, a ratio of the signals of 3.8μ and 4.4μ is calculated and if the value of the ratio is larger than the predetermined level (about ten times), the actual signal of 4.4μ is increased to some extent and difference between the actual signal of 3.8μ and the increased signal of 4.4μ and with is calculated the difference being larger than a certain predetermined level, the warning device 15 is actuated through I/O 17. A micro-computor or the like may replace I/O 17, CPU 18, the memory device 19 and so on.

With a micro-computor used in the device shown in FIG. 7, it is usually possible to treat with signals of a plurality of sensing heads with a single receiving device. Signals may be transmitted from the sensing head 16 to the receiving device either in the form of an analog signal or a digital signal produced by A/D conversion.

As mentioned above, the system according to the invention comprises a band-pass filter allowing radiations by resonant radiation emitted from $CO_2$ of high temperature in the flame to pass the filter and a band-pass filter allowing radiations located in the vicinity of said radiation but not absorbed by $CO_2$, a photoconductive conversion device adapted to receive the intensity of the radiation having passed these band-pass filters and to deliver outputs separately, a circuit for calculating a ratio of these outputs, a level detector for judging the value of the ratio and another circuit for calculating the difference in said outputs. According to the present invention, it is possible to avoid degradation of sensitivity due to direct solar light and to carry out sensing of a flame always with high sensitivity. Thus the flame sensing system according to the invention is practically very useful.

I claim:

1. A flame sensing apparatus comprising detecting means for producing a first electric output corresponding to the intensity of a first radiation of wavelengths produced by resonant radiation of carbon dioxide and a second electric output corresponding to the intensity of a second radiation of wavelengths which are in the vicinity of the wavelengths of the first radiation and in which there is little absorption by the carbon dioxide in the air and calculating a ratio of said first and second electric outputs, a level detector for comparing said ratio with a reference level and generating a signal when the ratio exceeds the reference level, means responsive to said signal for increasing said first electric output and also for decreasing said second electric output, means for calculating a first difference between said increased first electric output and said second electric output and also for calculating a second difference between said first electric output and said decreased second electric output, and a warning device for indicating the existence of a flame when either of said differences exceeds a predetermined level.

2. A flame sensing apparatus as claimed in claim 1 wherein said detecting means comprise a rotary disc having first and second band-pass filters mounted thereon, said first band-pass filter allowing said first radiation to pass therethrough, said second band-pass filter allowing said second radiation to pass therethrough, a single photoelectric conversion device for converting an output of each of said first and second band-pass filters into an electric output, a sample holding circuit including a pair of switches adapted to operate alternately in association with said first and second band-pass filters and a pair of condensers to store outputs of said photoelectric conversion device, and means for calculating the ratio of the outputs of said photoelectric conversion device stored in said condensers.

* * * * *